United States Patent
Preiss et al.

(10) Patent No.: US 7,061,904 B2
(45) Date of Patent: Jun. 13, 2006

(54) INTEGRATED ACCESS DEVICE CONTROLLER

(75) Inventors: Frank Preiss, Geltendorf (DE); Oliver von Soosten, Santa Cruz, CA (US)

(73) Assignee: Infineon Technologies North America Corp., San Jose, CA (US)

(*) Notice: Subject to any disclaimer, the term of this patent is extended or adjusted under 35 U.S.C. 154(b) by 1212 days.

(21) Appl. No.: 09/829,654

(22) Filed: Apr. 9, 2001

(65) Prior Publication Data

US 2002/0021690 A1 Feb. 21, 2002

Related U.S. Application Data

(63) Continuation-in-part of application No. 09/660,882, filed on Sep. 13, 2000.

(60) Provisional application No. 60/195,616, filed on Apr. 7, 2000, provisional application No. 60/153,762, filed on Sep. 13, 1999.

(51) Int. Cl.
*H04L 12/66* (2006.01)

(52) U.S. Cl. .................. 370/352; 370/353; 370/401; 370/402; 370/257

(58) Field of Classification Search ............... 370/352, 370/353, 257, 401, 402, 458, 442; 710/18
See application file for complete search history.

(56) References Cited

U.S. PATENT DOCUMENTS

| | | | |
|---|---|---|---|
| 5,970,069 A | 10/1999 | Kumar et al. | |
| 6,154,465 A * | 11/2000 | Pickett | 370/466 |
| 6,181,694 B1 * | 1/2001 | Pickett | 370/353 |
| 6,202,104 B1 * | 3/2001 | Ober | 710/8 |
| 6,208,658 B1 * | 3/2001 | Pickett | 370/401 |
| 6,266,340 B1 * | 7/2001 | Pickett et al. | 370/442 |
| 6,266,341 B1 * | 7/2001 | Surprenant et al. | 370/458 |
| 6,289,025 B1 * | 9/2001 | Pang et al. | 370/458 |
| 6,298,045 B1 * | 10/2001 | Pang et al. | 370/261 |
| 6,343,074 B1 * | 1/2002 | Pickett | 370/353 |
| 6,356,554 B1 * | 3/2002 | Pickett et al. | 370/402 |
| 6,366,578 B1 * | 4/2002 | Johnson | 370/353 |
| 6,385,194 B1 * | 5/2002 | Surprenant et al. | 370/353 |
| 6,396,849 B1 * | 5/2002 | Sarkissian et al. | 370/490 |
| 6,400,711 B1 * | 6/2002 | Pounds et al. | 370/353 |
| 6,445,682 B1 * | 9/2002 | Weitz | 370/257 |
| 6,498,791 B1 * | 12/2002 | Pickett et al. | 370/353 |
| 6,529,502 B1 * | 3/2003 | Sarkissian et al. | 370/353 |
| 6,560,222 B1 * | 5/2003 | Pounds et al. | 370/353 |
| 6,587,454 B1 * | 7/2003 | Lamb | 370/352 |

FOREIGN PATENT DOCUMENTS

EP   0 851 653 A2   7/1998

OTHER PUBLICATIONS

Cassing, "C6x Solutions for Voice Over IP Gateway," Northcon '98, Conference Proceedings, Seattle, WA, Oct. 21-23, 1998, *IEEE*, 1998, pp. 74-85.

Martin et al., "A 200MHz 0.25W Packet Audio Terminal Processor for Voice-over-Internet Protocol Applications," 2000 IEEE International Solid-State Circuits Conference, *IEEE*, 2000, pp. 236-237.

* cited by examiner

*Primary Examiner*—Wellington Chin
*Assistant Examiner*—Chuong Ho
(74) *Attorney, Agent, or Firm*—Fish & Richardson P.C.

(57) ABSTRACT

A network processor (12) for a voice over Internet protocol phone integrates a universal serial bus port (56), a pair of IEEE 802.3 MACs (70a), a repeater (70b), and a pair of pulse code modulation (PCM) ports (24) such that the network processor can be combined with other peripherals to transmit both voice and data over an Internet protocol network (13).

18 Claims, 4 Drawing Sheets

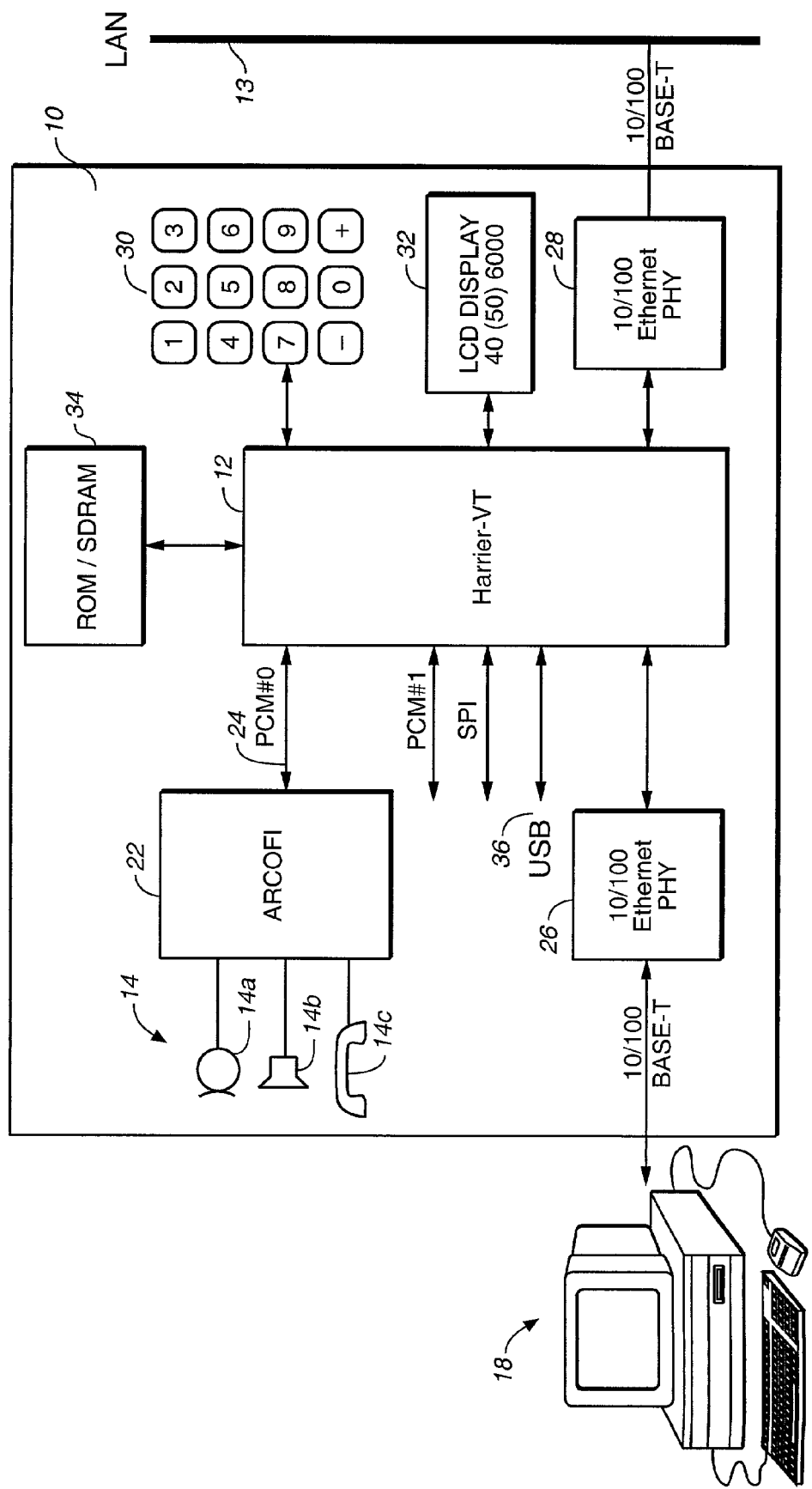
FIG._1

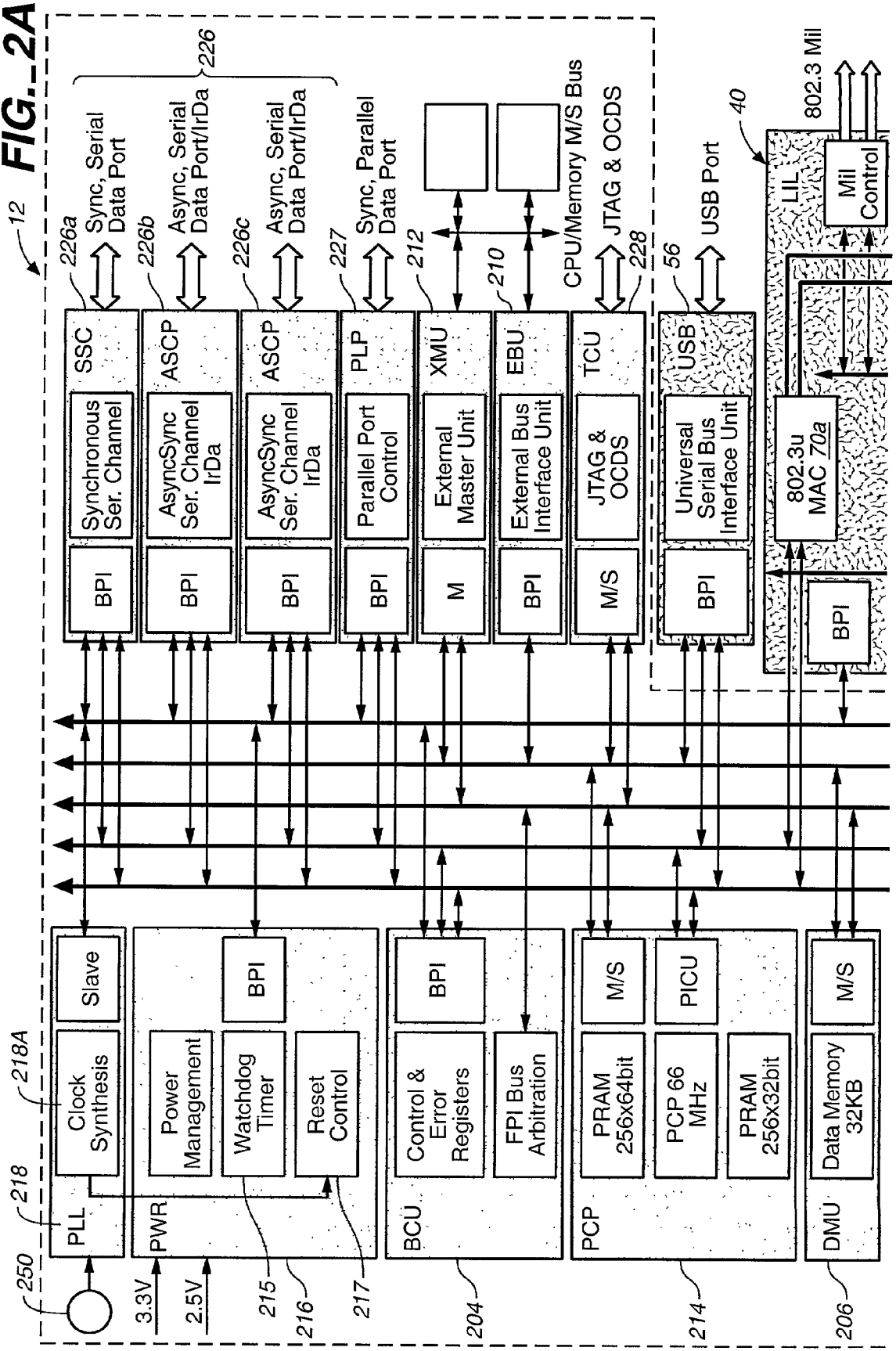

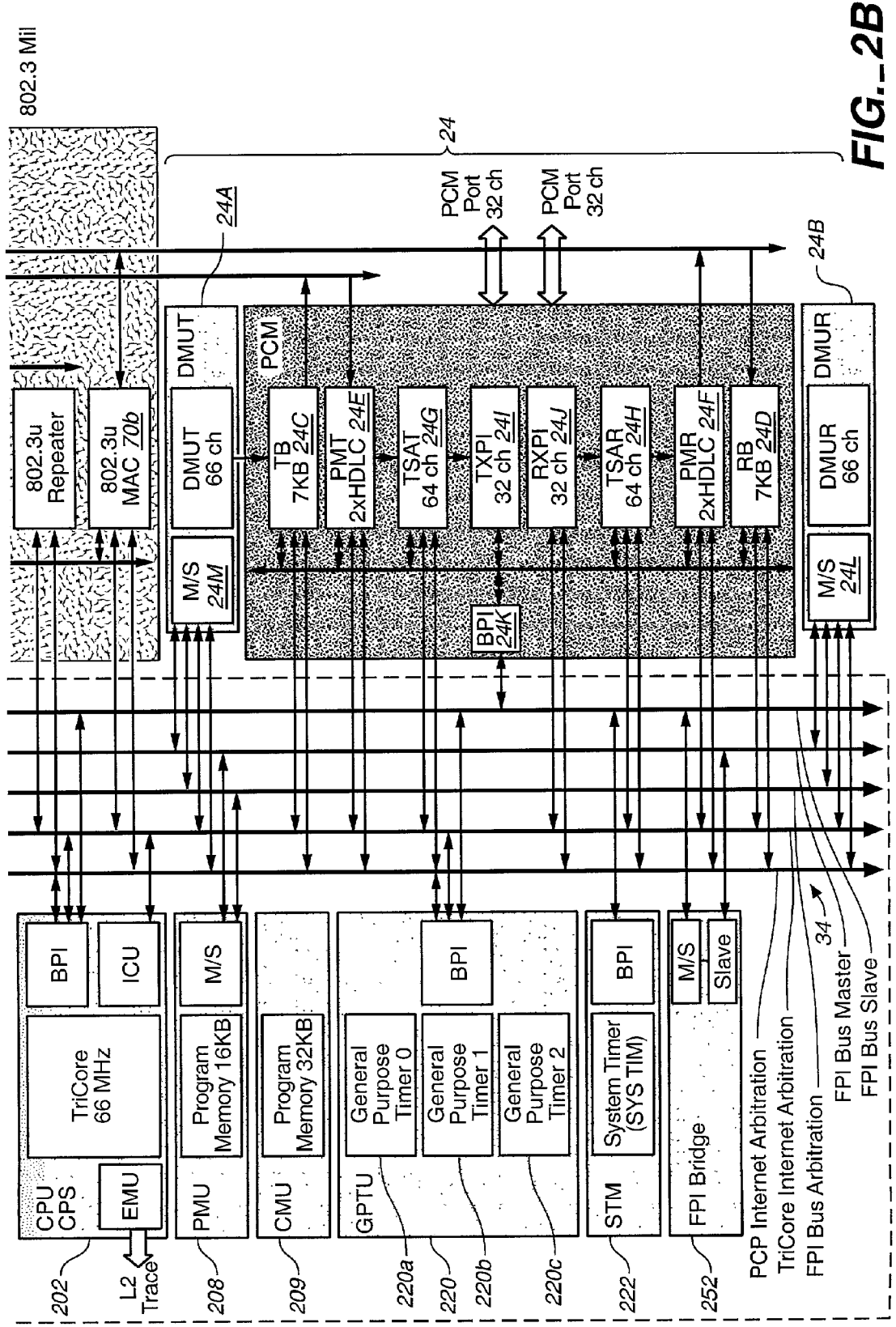
FIG._2B

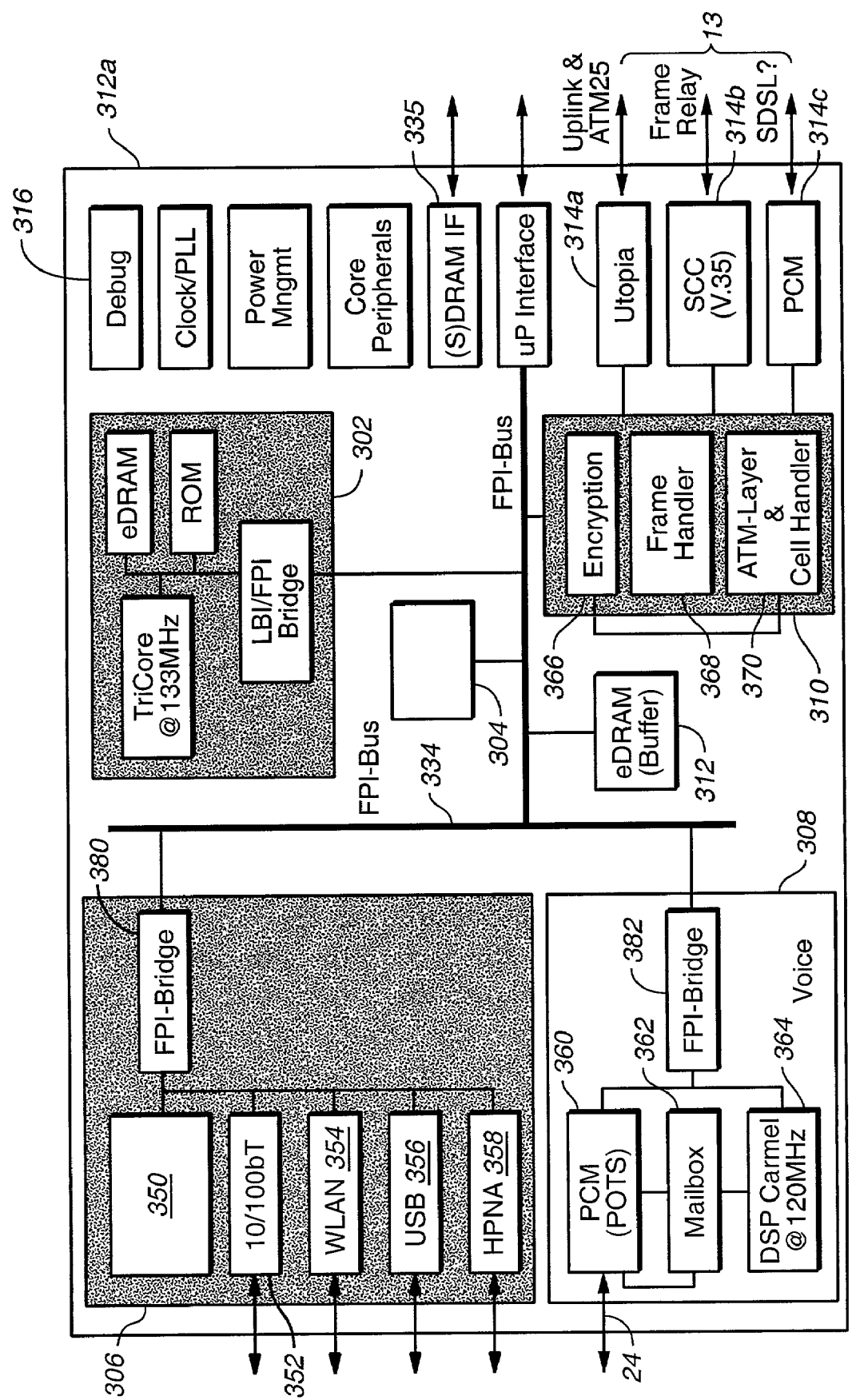
FIG._3

INTEGRATED ACCESS DEVICE CONTROLLER

CROSS REFERENCE TO RELATED APPLICATION

This application claims priority from U.S. provisional application 60/195,616, filed Apr. 7, 2000 and from U.S. Provisional Application Ser. No. 60/153,762, filed Sep. 13, 1999. This application is a continuation-in-part of co-pending application Ser. No. 09/660,882, filed Sep. 13, 2000.

TECHNICAL FIELD

The present invention relates to communication systems in general, and in particular to voice over Internet protocol (IP) communication systems.

BACKGROUND

As computer networks become more prevalent and powerful, the boundaries between traditional telephony and data communication become increasingly blurred. For example, the Internet is a global network of computers wherein data is transmitted from a source to a destination as a series of individually addressed packets. Such packets are most often used to carry computer data. However, it is also possible to transmit real time voice data over a packetized network, provided that proper compression techniques are used and the speed of the network is fast enough to avoid producing noticeable delay. When operating correctly, voice data transmitted over the Internet has nearly the same quality as voice data transmitted over conventional telephone lines.

One advantage of using an Internet protocol (IP) network to carry both computer and voice data in an area is that only a single set of wiring is needed. This is particularly advantageous for large businesses where the cost of installing the wiring for both data and telecommunications networks is considerable.

Most voice over IP network telephones are controlled by a network processor that performs the functions of data compression and encoding as well as transmitting and receiving data from the computer network. In the past, such network processors had limited ability to interface with other peripherals, thereby requiring a number of other electronic sub-systems to be provided in order to potential applications for such processors and to reduce the cost of the systems that employ them, there is a need for a network processor having integrated peripheral interfaces.

SUMMARY

In one aspect, the invention is directed to a processor for use in a Voice over Internet Protocol (VoIP) telephone. The processor has a bus, a processor core coupled to the bus, a packet handler coupled to the bus, a voice handler coupled to the bus, a cell/frame handler coupled to the bus, and a peripheral control processor. The packet handler includes a plurality of ports for interfacing to one or more workstations, the voice handler includes at least one port for interfacing to a telephone, the cell frame handler is adapted to couple to one or more packet networks, and the peripheral control processor handles interrupts and DMA requests.

In another aspect, the invention is directed to a telecommunications system that has a local area network, a workstation, a telephone, and a Voice over Internet Protocol interface coupling the telephone and the workstation to the local area network. The VoIP interface includes a VoIP processor. The VoIP processor has a bus, a processor core coupled to the bus, a packet handler coupled to the bus, a voice handler coupled to the bus, a cell/frame handler coupled to the bus, and a peripheral control processor. The packet handler includes a plurality of ports for interfacing to the workstation, the voice handler includes at least one port for interfacing to the telephone, the cell frame handler is adapted to couple to the local area network, and the peripheral control processor handles interrupts and DMA requests.

Implementations may include one or more of the following features. The packet handler may include a bus bridge for interfacing to the bus, a 10/100bT interface, a wireless LAN interface, a Universal serial bus interface, and a home phoneline networking alliance interface. The voice handler may include a bus bridge for interfacing to the bus, one or more PCM ports, a mailbox, and a DSP core. The cell/frame handler may include a frame handler for sending and receiving frames over the one or more packet networks, an ATM handler for sending and receiving data over ATM networks, and an encryption unit for encrypting said data.

In other aspects, the invention is directed to a method of providing a Voice over Internet Protocol (VoIP) processor or a method of providing a telecommunications system having these features.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a block diagram of an Internet protocol phone in accordance with the present invention;

FIG. 2 is a block diagram of a voice over Internet protocol processor including an integrated USB port, media access controllers, repeater ports and a pair of integrated pulse code modulation ports in accordance with the present invention;

FIG. 3 is a block diagram of an integrated access device controller according to another implementation of the invention.

DETAILED DESCRIPTION

In brief, the voice over IP network processor can be used for transmitting both computer and voice data over a packetized computer network. A network processor according to one embodiment of the invention includes integrated circuitry that connects the processor to a variety of peripherals. Specifically, the network processor includes an integrated universal serial bus (USB), an IEEE 802.3 media access controllers (MACs), a repeater and an integrated pair of PCM HDLC ports that allow peripherals such as A/D and D/A converters to be easily interfaced with the processor. The peripheral interfaces are integrated into the processor through a flexible peripheral interconnect (FPI) bus.

A network processor according to another embodiment of the invention includes an embedded processor, a packet handler, a voice handler, and a cell/frame handler, all coupled to a system bus. Also coupled to the bus is a Peripheral Control Processor for handling interrupts and direct memory access (DMA) functions, a buffer memory, and a plurality of peripherals. The packet interface may be operable to interface to a variety of packet networks, such as local area networks via a 10/110bT interface, a Wireless Local Area network, a Universal Serial bus network, or a home phone network association network. The cell/frame handler may provide for interfacing to ATM networks, frame relay networks, or xDSL based networks.

FIG. 1 is a block diagram of a voice over Internet protocol (IP) telephone system constructed in accordance with an implementation of the present invention. The telephone system 10 includes a network processor 12 that performs a variety of functions including assembling a digital voice signal into a series of packets and transmitting and receiving packets over a local area network 13.

The local area network may be coupled to a wide area network such as the Internet, through a gateway (not shown). The telephone system 10 also includes a microphone 14a, speaker 14b and handset 14c that are connected to the network processor 12 through a digital-to-analog/analog-to-digital (DA/AD) converter 22. The DA/AD converter 22 is connected to the network processor 12 via an integrated pulse code modulation (PCM) port 24 that is described in further detail below. Each of the PCM ports can handle up to 30 time slots with each slot capable of handling a 64K bit/sec voice channel. The PCM ports therefore serve as the interface between the internal hardware of the IP processor and an external peripheral. In addition to transmitting and receiving voice data, the telephone system also transmits and receives data from a workstation 18 that is connected to the network processor 12 through an Ethernet port 26. A second Ethernet port 28 is used to connect the network processor to the local area network 13.

A keypad 30 is interfaced with the network processor 12 to allow a user to dial telephone numbers and an LCD display 32 is provided so that a user can see the information entered on the keypad. Finally, the telephone system 10 includes a memory unit 34 to store programs and other data required by the network processor 12.

FIG. 2 is a block diagram of the network processor 12, the details of which are described in the specification titled "Harrier-VT", attached as EXHIBIT A. The network processor 12 includes a core processor 202, internal bus 34, bus control unit 204, data memory unit 206, program memory unit 208, code memory unit 209, external bus interface unit 210, external master unit 212, peripheral control processor 214, a power management unit 216 that includes a watchdog timer 215, a system timer 222, general purpose timer unit 220, serial interfaces 226, a parallel port module 227, a clock formed by an oscillator 250 and a phase locked loop 218, a JTAG/OOCS port 228, an FPI bridge 252, and interfaces for an Ethernet port 40, a USB port 56, and PCM ports 24.

The core processor 202 is exemplary of the TriCore processor, available from Infineon Technologies, Corp. The TriCore is a 32-bit microcontroller/DSP core containing two major pipelines that support integer and load/store operations and a third pipeline that supports optimized DSP loop operation.

The internal bus 34 is exemplary of the FPI bus, described in the specifications entitled "Flexible Peripherals Interconnect Bus Version 3.2" and "BPI Specification Draft Version 0.9" attached as EXHIBITs C and D, respectively. Briefly, the FPI bus 34 is a high speed, 32 bit address/data bus, supporting burst read and write of 2, 4, or 8 words.

The bus control unit 204 handles bus arbitration between on chip FPI bus masters (i.e., the JTAG port 228 for debug support, the peripheral control processor 214, the external master unit 212, the program memory unit 208, the data memory unit 206, a transmit data management unit 24A, and a receive data management unit 24B). It further acts as a default bus slave when an invalid/nonexistent unit is addressed, and captures bus error and timeout events.

The data memory unit 206 is for data memory storage and includes an on chip local memory, a cache, and an interface to the internal bus 34.

The program memory unit 208 is for program memory storage and includes an on chip local memory, a cache, and an interface to the internal bus 34.

The code memory unit 206 is a second level program memory and connects directly to the program memory unit 208.

The external bus unit 210 provides the interface between the processor 12 and the system devices. In the embodiment illustrated, the external bus unit 210 has a demultiplexed 24 bit address and 32 bit data bus, and can interface, for example, to external ROM, EPROM, SRAM, and synchronous DRAM.

The external master unit 212 is a chip select pin for access to internal bus 34 locations using an external bus master.

The peripheral control processor 214 performs as a DMA controller and interrupt service processor. It off loads the CPU from most time critical interrupts. Briefly, the peripheral control processor 214 is a programmable, interrupt-driven microcontroller for data transfer and peripheral control, and includes instructions for DMA and bit handling.

The processor 12 includes three timing units: the watchdog timer 215, the system timer 222, and the general purpose timer unit 220. The watchdog timer 215 provides a recovery mechanism from hardware or software failure. The system timer 222 is a high precision long range 56 bit timer that provides a global system time for operating systems and other purposes. The general purpose timer unit 220 includes three general purpose 32 bit timers 220a, 220b, 220c. The three timers can be used in timing events, counting events, and recording events. Further, the timers can be run in stand alone mode or be connected together to solve more complex tasks.

Three serial interfaces 226 are provided: a synchronous serial channel 226a, and two asynchronous serial communication interfaces 226b and 226c. The synchronous serial channel 226a supports full duplex and half duplex synchronous communication between the processor 12 and other external devices, such as microcontrollers, microprocessors, and the like. The asynchronous interfaces 226b, 226c operate in either asynchronous or synchronous mode.

The parallel port module 227 is an 8 bit wide port that provides general purpose I/O functions.

The phase locked loop 218 includes a clock synthesizer/oscillator circuit 218A. The PLL 218 allows connection to either on-chip oscillating crystal 250 or to an external crystal or clock.

The power management unit 216 allows battery-operated devices to be accommodated. The power management unit 216 includes a reset system 217 for power on, hardware, software, and watchdog timer resets.

The USB port 56 is integrated on the same circuit as the network processor 12 as described in the specification entitled "Universal Serial Bus Device Controller Version 1.1", attached as EXHIBIT B.

To connect the network processor 12 directly to a local area network, the processor includes an IEEE 802.3 interface 40, including a pair of IEEE 802.3 media access controllers 70a, 70b and a repeater 70c in accordance with the IEEE standard.

Each of the USB ports, 802.3 MACs and the PCM ports are connected to the internal bus, such as the flexible peripheral interconnect bus 34 that is described in the specifications entitled "Flexible Peripherals Interconnect Bus Version 3.2" and "BPI Specification Draft Version 0.9" attached as EXHIBITs C and D, respectively.

As discussed above, to provide a convenient interface to the DA/AD converter 22, the network processor 12 includes a pair of integrated PCM ports 24. The PCM ports comprise a number of sub-components including a data management unit transmit block 24A and data management receive block 24B that are described in the attached specification entitled "Macro Specification DMUT Version 2.2" and "Macro Specification DMUR Version 2.2", attached as EXHIBITs E and F, respectively.

In addition, the PCM ports include a transmit and receive buffer 24C and 24D that are described in the specifications entitled "Macro Specification TB Version 2.1", "Macro Specification TB data sheet" and "Receive Buffer V2.1", attached as EXHIBITs G, H and I, respectively.

Also included in the PCM ports 24 are a protocol machine transmit and receive blocks 24E and 24F that are described in the specifications entitled "Protocol Machine Transmit Version 2.2" and "Macro Specification PMR Version 2.1", attached as EXHIBITs J and K, respectively.

A time slot assignee receive and transmit blocks 24G and 24H are included in the PCM ports 24 and are described in the specifications entitled "Timeslot Assigner Receive V2.2.1" and "Timeslot Assigner Transmit V2.2.1", attached as EXHIBITs L and M, respectively.

The PCM port 24 also includes a receive/transmit port interface block 24I, 24J that are described in the specification entitled "Receive/Transmit Port Interface V2.3.1", attached as EXHIBIT N.

A data management transmit and receive blocks 24A and 24B are connected to the FPI bus 34 through a master/slave interfaces 24L and 24M that are described in the specification entitled "Platform Concept: SMIF Specification Version 1.0", attached as EXHIBIT O.

The remaining components of the PCM port 24 are connected to the FPI bus 34 through a BPI interface 24K as described in "BPI Specification Draft Version 0.9", see EXHIBIT D.

FIG. 3 is a block diagram of an integrated access device according to another implementation of the invention, various components of which are described in greater detail in EXHIBIT A and/or EXHIBIT P, in the document titled "PEB 4261 Version 0.1." The integrated access device controller includes an embedded processor 302, such as the TriCore, available from Infineon Technologies Corp., a packet handler 306, a voice handler 308, and a cell/frame handler 310, all coupled to a system bus 334. The system bus 334 is exemplary of the FPI bus, described in the specifications entitled "Flexible Peripherals Interconnect Bus Version 3.2" and "BPI Specification Draft Version 0.9" attached as EXHIBITs C and D, respectively.

Also coupled to the FPI bus 334 is a Peripheral Control Processor 304 for handling interrupts and direct memory access (DMA) functions, a buffer memory 312, and a plurality of peripherals 316. The PCP processor 304 and the peripherals 316 may be known devices associated with the TriCore embedded processor.

The TriCore is a 32-bit microcontroller/DSP core containing two major pipelines that support integer and load/store operations and a third pipeline that supports optimized DSP loop operation.

The packer handler 306 includes an FPI bridge 380 for interfacing to the FPI bus 334, a PCP packet preprocessor 350, and a variety of I/O units, including an Ethernet port 352, a wireless local area network port 354, a Universal Serial bus port 356, and a Home PNA (Phoneline Networking Alliance) port 358. The packet handler's I/O units couple to a workstation (not shown) such as a personal computer. An exemplary USB port is described in the attached EXHIBIT B, or U.S. patent application Ser. No. 09/545,393, filed Apr. 7, 2000, and titled "USB Interfacing Using FIFO Buffers." The Ethernet port 352 is implemented in accordance with the IEEE 802.3 standard. The wireless LAN port 354 may implement, for example, the IEEE 802.11 WLAN standard. The HPNA port 358 may implement the Home PNA 2.0; similar ports are available from vendors such as NetGear and D-Link.

The voice handler 308 couples to the public switched telephone network and includes an FPI bridge 382, at least one integrated PCM port 360, a mailbox 362, and a DSP 364.

The PCM port 360 is generally similar to that described above with reference to the EXHIBITS E-O, entitled "Macro Specification DMUT Version 2.2," "Macro Specification DMUR Version 2.2", "Macro Specification TB Version 2.1", "Macro Specification TB data sheet", "Receive Buffer V2.1", "Protocol Machine Transmit Version 2.2", "Macro Specification PMR Version 2.1", "Timeslot Assigner Receive V2.2.1", "Timeslot Assigner Transmit V2.2.1", "Receive/Transmit Port Interface V2.3.1", and "Platform Concept: SMIF Specification Version 1.0", respectively.

The digital signal processor (DSP) 364 and the mailbox 362 may be implemented as known systems, for example as a DSP similar to that of the TriCore embedded controller.

The cell/frame handler 310 is operative to send and receive cells and/or frames over a packet network according to a variety of standards. Thus, the cell/frame handler 310 may include a frame handler 368 and an ATM cell handler 370. A variety of input/output ports may be provided: an SCC (V.35), i.e., frame relay, port 314b; a Utopia interface 314a, and a PCM port 314c for interfacing to an XDSL channel. Other packet network interfaces, such as Ethernet interfaces, may be provided.

In addition, the cell/frame handler 310 may implement encryption to protect communications along the packet network. In particular, the encryption unit 366 may implement the functionality described in the attached EXHIBIT Q.

The network processor 312a generally implements packet and frame modes of operation. In a packet mode, the system 312a may be coupled to a Local Area Network via the 10/100bT interface 352, a wireless Local Area Network via the WLAN interface 354, a USB based network via the USB interface 356, or a home telephone based network via the HPNA interface 358. The packet control processor 350 supervises data transfers to and from these interfaces.

For example, in operation, speech is encoded by an external voice encoder (not shown) which is connected to one of the PCM ports 360. The encoded voice data is transported via the bus 334 to external memory (e.g., via DRAM interface 335). The processor 302 reads the data from memory, performs voice compression, and then writes it back to the external memory. Next, the voice packets are read from the external memory and forwarded, again via the bus 334, to one of the packet interfaces 352, 354, 356, 358. The data is then fed onto the appropriate network.

In the receive direction, the appropriate interface 352, 354, 356, 358 listens for traffic. Upon detection, the corresponding data packets are transferred to the external memory. The processor 302 reads this data, performs voice compression, and writes it back to external memory. Thereafter, the data is transported via the PCM interface to an external decoder (not shown).

In cell/frame mode, the system may coupled to an ATM25 network via interface 314a, to a frame relay network via interface 314b, or an xDSL network via interface 314c. In operation, speech is encoded by an external voice encoder (not shown) which is connected to one of the PCM ports 360. The encoded voice data is transported via the bus 334 to external memory (e.g., via DRAM interface 335). The processor 302 reads the data from memory, performs voice compression, and then writes it back to the external memory. Next, the voice data are read from the external memory by and forwarded, again via the bus 334, to the cell/frame handler 310. The cell/frame handler 310 may perform encryption using the encryption unit 366. Next, depending on which network is coupled in to the processor, the data are formatted in the frame handler 368 or ATM/Cell handler 370. The data is then fed onto the appropriate network.

In the receive direction, the appropriate interface 314a, 314b, 314c listens for traffic. Upon detection, the frames or cells are de-formatted and are transferred to the external memory. The processor 302 reads this data, performs voice compression, and writes it back to external memory. Thereafter, the data are transported via the PCM interface 360 to an external decoder (not shown).

As can be seen from the above description, the present invention is a voice over IP network processor having integrated interface ports that allow the processor to be easily coupled to a variety of external components and peripherals.

The invention claimed is:

1. A processor for use in a Voice over Internet Protocol (VoIP) telephone, comprising:
 a bus;
 a processor core coupled to the bus;
 a packet handler coupled to the bus, the packet handler including plurality of first ports for interfacing to one or more workstations;
 a voice handler coupled to the bus, the voice handler including at least one second port for interfacing to a telephone;
 a cell/frame handler coupled to the bus, the cell frame handler adapted to couple to one or more packet networks; and
 a peripheral control processor coupled to the bus for handling interrupts and direct memory access (DMA) requests;
wherein the peripheral control processor is a programmable, interrupt-driven microcontroller for data transfer and peripheral control, and includes instructions for DMA and bit handling.

2. A processor according to claim 1, wherein the packet handler includes a bus bridge for interfacing to the bus, a 10/100bT interface, a wireless local area network (LAN) interface, a Universal serial bus interface, and a home phoneline networking alliance interface.

3. A processor according to claim 2, wherein the voice handler includes a bus bridge for interfacing to the bus, one or more pulse code modulation (PCM) ports, a mailbox, and a digital signal processor (DSP) core.

4. A processor according to claim 3, wherein the cell/frame handler includes:
 a frame handler for sending and receiving frames over the one or more packet networks;
 an asynchronous transfer mode (ATM) cell handler for sending and receiving data over ATM networks; and
 an encryption unit for encrypting the data.

5. A method for providing a Voice over Internet Protocol (VoIP) processor comprising:
 providing a bus;
 providing a processor core coupled to the bus;
 providing a packet handler coupled to the bus, the packet handler including plurality of ports for interfacing to one or more workstations;
 providing a voice handler coupled to the bus, the voice handler including at least one port for interfacing to a telephone;
 providing a cell/frame handler coupled to the bus, the cell frame handler adapted to couple to one or more packet networks; and
 providing a peripheral control processor coupled to the bus for handling interrupts and DMA requests;
wherein the peripheral control processor is a programmable, interrupt-driven microcontroller for data transfer and peripheral control, and includes instructions for DMA and bit handling.

6. A method according to claim 5, wherein providing the packet handler including providing a bus bridge for interfacing to the bus, a 10/100bT interface, a wireless LAN interface, a Universal serial bus interface, and a home phoneline networking alliance interface.

7. A method according to claim 6, wherein providing the voice handler including providing a bus interface for interfacing to the bus, one or more PCM ports, a mailbox, and a DSP core.

8. A method according to claim 7, wherein providing the cell/frame handler including:
 providing a frame handler for sending and receiving frames over one or more packet networks;
 an ATM cell handler for sending and receiving data over ATM networks; and
 an encryption unit for encrypting the data.

9. A telecommunications system, comprising:
 a local area network;
 a workstation;
 a telephone; and
 a Voice over Internet Protocol interface coupling the telephone and the workstation to the local area network, the VoIP interface including a VoIP processor, the VoIP processor including
  a bus,
  a processor core coupled to the bus,
  packet handler coupled to the bus, the packet handler including plurality of ports for interfacing to the workstation,
  voice handler coupled to the bus, the voice handler including at least one port for interfacing to the telephone,
  cell/frame handler coupled to the bus, the cell frame handler adapted to couple to the local area network, and
  peripheral control processor coupled to the bus for handling interrupts and DMA requests;
wherein the peripheral control processor is a programmable, interrupt-driven microcontroller for data transfer and peripheral control, and includes instructions for DMA and bit handling.

10. A telecommunications system according to claim 9, wherein the packet handler includes a bus bridge for interfacing to the bus, a 10/100bT interface, a wireless LAN interface, a Universal serial bus interface, and a home phoneline networking alliance interface.

11. A telecommunications system according to claim 10, wherein the voice handler includes a bus interface for interfacing to the bus, one or more PCM ports, a mailbox, and a DSP core.

12. A telecommunications system according to claim 11, wherein the cell/frame handler includes:
   a frame handler for sending and receiving frames over the one or more packet networks;
   an ATM cell handler for sending and receiving data over ATM networks; and
   an encryption unit for encrypting the data.

13. A method of providing a telecommunications system, comprising:
   providing a local area network;
   providing a workstation;
   providing a telephone; and
   providing a Voice over Internet Protocol interface coupling the telephone and the workstation to the local area network, the VoIP interface including a VoIP processor, the VoIP processor including
   a bus,
   a processor core coupled to the bus,
   a packet handler coupled to the bus, the packet handler including plurality of ports for interfacing to the workstation,
   voice handler coupled to the bus, the voice handler including at least one port for interfacing to the telephone,
   a cell/frame handler coupled to the network, the cell frame handler adapted to couple to the local area network, and
   a peripheral control processor coupled to the bus for handling interrupts and DMA requests;
   wherein the peripheral control processor is a programmable, interrupt-driven microcontroller for data transfer and peripheral control, and includes instructions for DMA and bit handling.

14. A telecommunications method according to claim 13, wherein providing the packet handler including providing a bus bridge for interfacing to the bus, a 10/100bT interface, a wireless LAN interface, a Universal serial bus interface, and a home phoneline networking alliance interface.

15. A telecommunications method according to claim 14, wherein providing the voice handler includes providing a bus interface for interfacing to the bus, one or more PCM ports, a mailbox, and a DSP core.

16. A telecommunications method according to claim 15, wherein providing the cell/frame handler includes:
   providing a frame handler for sending and receiving frames over one or more packet networks;
   an ATM cell handler for sending and receiving data over ATM networks; and
   an encryption unit for encrypting the data.

17. A processor according to claim 1, wherein the bus is a flexible peripheral interconnect bus.

18. A processor according to claim 1, wherein the processor core is a microcontroller having two pipelines that support integer and load/store operations, and a third pipeline that supports optimized digital signal processor loop operation.

* * * * *